United States Patent
Latch et al.

(10) Patent No.: US 12,253,186 B2
(45) Date of Patent: Mar. 18, 2025

(54) VALVE STEM LIFTER

(71) Applicant: Vanzandt Controls, LLC, Odessa, TX (US)

(72) Inventors: Dave Latch, Odessa, TX (US); Anthony Prieto, Odessa, TX (US)

(73) Assignee: Vanzandt Controls, LLC, Odessa, TX (US)

( * ) Notice: Subject to any disclaimer, the term of this patent is extended or adjusted under 35 U.S.C. 154(b) by 108 days.

(21) Appl. No.: 17/979,485

(22) Filed: Nov. 2, 2022

(65) Prior Publication Data
US 2023/0160495 A1 May 25, 2023

Related U.S. Application Data

(63) Continuation-in-part of application No. 17/387,977, filed on Jul. 28, 2021, now abandoned.

(60) Provisional application No. 63/059,124, filed on Jul. 30, 2020.

(51) Int. Cl.
*F16K 31/50* (2006.01)

(52) U.S. Cl.
CPC ............ *F16K 31/50* (2013.01); *F16K 31/508* (2013.01)

(58) Field of Classification Search
CPC ....... F16K 31/50; F16K 47/045; F16K 31/508
USPC .................................................. 251/266–267
See application file for complete search history.

(56) References Cited

U.S. PATENT DOCUMENTS

| 191,848 | A | | 6/1877 | Gorman | |
|---|---|---|---|---|---|
| 858,771 | A | | 7/1907 | Whitehouse | |
| 1,805,106 | A | * | 5/1931 | Robinson | F16K 1/50 137/546 |
| 2,289,931 | A | * | 7/1942 | Poirier | F16K 31/528 251/247 |
| 3,628,397 | A | * | 12/1971 | Sheesley | F16H 25/2204 74/625 |
| 4,293,117 | A | * | 10/1981 | Mueller | F16K 31/5284 74/57 |
| 4,384,704 | A | * | 5/1983 | Wolff | B63B 27/24 251/267 |
| 4,406,304 | A | * | 9/1983 | Vamvakas | B01D 21/2483 251/266 |

OTHER PUBLICATIONS

High Pressure Control Valve R2L Actuator, Installation Operation & Maintenance Guide, Kimray Inc., Issued Mar. 2023 , pp. 1-16.

* cited by examiner

*Primary Examiner* — John Bastianelli
(74) *Attorney, Agent, or Firm* — Bradley Arant Boult Cummings LLP; Stephen H. Hall; Jessica L. Zurlo

(57) ABSTRACT

A valve stem lifter assembly which operates to alternatively open and close a valve, includes a rotatably mounted rotary shaft having a top end axially aligned with a riser with a rigidly connected pull shaft and an opposite end axially aligned with an operator for selectively producing rotational movement of the rotary shaft and corresponding axial movement of the riser and pull shaft. The rotary shaft is rotatably connected to the riser by radius set screws positioned horizontally in the grooves of the rotary shaft. A plurality of guide shaft rods passing through the riser interconnects the riser to the valve stem lifter assembly to prevent axial separation of the riser and rotary shaft, and rotation of the riser, while permitting free relative rotation of the rotary shaft and axial movement of the riser and pull shaft.

18 Claims, 5 Drawing Sheets

VALVE STEM LIFTER

CROSS REFERENCE TO RELATED APPLICATIONS

This disclosure is a continuation-in-part from, and claims the benefit of, prior U.S. patent application Ser. No. 17/387,977 filed on Jul. 28, 2021, which application claims the benefit of and priority to U.S. Provisional Patent Application Ser. No. 63/059,124, filed Jul. 30, 2020.

BACKGROUND OF INVENTION

Field of Use

The present invention relates to a valve stem lifter, and more particularly to a valve stem lifter for mechanical equipment that opens a valve to allow the throttling of a fluid such as oil, natural gas, chemical or water to flow through the valve.

Description of Related Art

A variety of fluid flow control valves and corresponding valve actuators are utilized for either on/off control or throttling the flow of fluid, such as in a gas or oil pipeline system, or in other process fluid systems. Fluid flow control valves are typically sliding stem or rotary action control valves, and are usually operated by a valve actuator such as an electric or pneumatic actuator responding to the output of a valve positioner or valve controller instrument for accurate throttling control of the valve.

Rotary action control valves typically employ a flow control member in the form of a ball or a butterfly element. The rotation of a valve stem axially positions the flow control element to a position to open or close the valve gate or plug.

Rotation of a rotary shaft by means of the actuator can be translated to linear motion of a pull shaft that is directly connected to elements that open or close the valve. The stroke length of the pull shaft is achieved through the rotation of the rotary shaft (e.g., clockwise turn to open; counter-clockwise to close the valve). A plug or similar element connected to the pull shaft contacts the seat to close the valve. In some prior art variations, a series of springs are loaded when the valve in the closed position to prevent seat creep or wear.

Prior art rotary valve actuators may employ many components, several of which require time consuming and expensive machining during manufacture and significant maintenance from harsh conditions and cycling encountered in the field. Users of traditional rotary valve actuators, therefore, must have access to an inventory of a large number of parts, including a number of expensive, machined spare parts for repair and replacement, adding to costs.

With the exemplary embodiment of the present valve stem lifter, it is desired to provide a more universal valve lifter capable of efficiently operating multiple sizes of valves. With prior art systems, each valve respectively has different diameters requiring a variable range of stroke lengths of the system's pull shaft to open or close the valve. This requires each rotary valve actuator to have a respective matching shaft especially made for each size of valve, such that a universal rotary actuator effectively becomes very different from valve to valve.

It is desired therefore to simplify and reduce the number of parts as well as to reduce the number of expensive machined parts for a valve lifter so as to thereby reduce manufacturing costs and inventory requirements both for the manufacturer and the user. In addition, it is further desired to provide a rotary valve lifter of reduced size and weight, and one having the capability of fully actuating a variety of valves to reduce the number and sizes of valve actuators required.

Further, in order to properly seat a valve, the pull shaft must be able to travel over a sufficient stroke length to fully open and close the valve, which can be a limiting factor to the type and size of valve actuator and the valves that can be operated with traditional systems. The continuous cycling and torquing of the pull shaft without full extension to close and align the valve may also damage the valve itself.

The valve seat lifter for rotary valve actuators of this invention provides negligible lost motion between the rotary shaft and the pull shaft. In addition to the foregoing, the following advantages are also obtained over traditional rotary valve actuator systems: simplification of the assembly of actuator and lifter to a given valve; reduction in the total number of actuator parts; a more universal valve lifter with an actuator fits multiple valve sizes; reduced loss of motion that provides better valve control; and easier changes to existing valve mountings, and adaptations to older style mounts.

SUMMARY OF INVENTION

The main objective of the present invention is to provide a highly versatile valve stem lifter that can fully and reliably open and close multiple sizes of valves without damaging the valve.

Another object of the instant invention is achieved by providing a longer stroke during the insertion and retraction (lift) of the pull shaft (see FIGS. 1 &2) (136) per rotation of the rotary shaft (102) than what is available in the prior art, at lower cost and expense. In the exemplary embodiment of the present invention, approximately 3 inches of stroke for the pull shaft (136) has been achieved per full (270°) rotation of the rotary shaft (102).

Another object of the invention is to overcome the problems discussed above and provide a valve and actuating assembly which decreases undue or unbalanced torque transmission to the valve components between a rotary actuator and the valve element, while also eliminating backlash.

Similar-sized prior art valve stem lifters typically provide only ¾ inches of lift per full rotation of their rotary shaft, which limits their operational range on the size of valves for which they can be used. To achieve a longer lift approaching what has been achieved through the instant invention, larger size valves are required with more expensive actuators. The present invention achieves longer lift options at lower cost of materials for the exemplary embodiment than what is known in the prior art.

Other objectives, advantages and novel features of the present invention will become more apparent from the following detailed description when taken in conjunction with the accompanying drawings.

SUMMARY OF DRAWINGS

Some embodiments of the present invention are illustrated as an example and are not limited by the figures of the accompanying drawings, which are incorporated in and constitute a part of the specification. These drawings, together with the general description of the invention given

Figure 1:
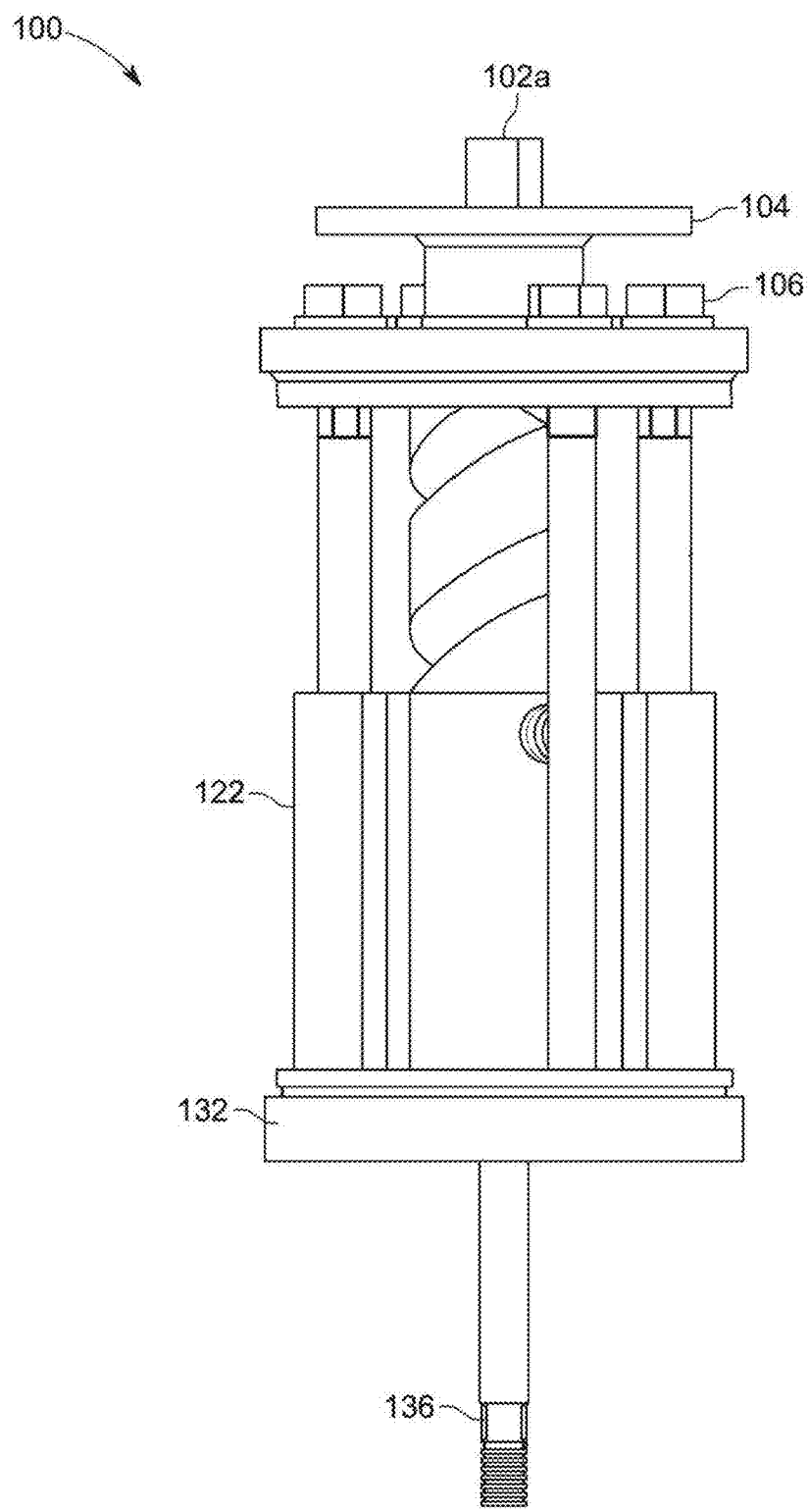
FIG. 1 is a side view of an exemplary embodiment of the present invention.

Many aspects of the invention can be better understood with reference to the above referenced drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views. Other features of the present embodiments will be apparent to a person of ordinary skill in the art from the detailed description that follows.

DETAILED DESCRIPTION OF THE PREFERRED EMBODIMENT

Referring more particularly to the drawings which are for the purpose of illustrating preferred embodiments of the invention only, and not for the purpose of limiting same:

Throughout this disclosure, components and features of the disclosed invention may be discussed with reference to more than one illustration. A particular component or feature is given the same numeral throughout this disclosure and the accompanying illustrations.

Figure 2:
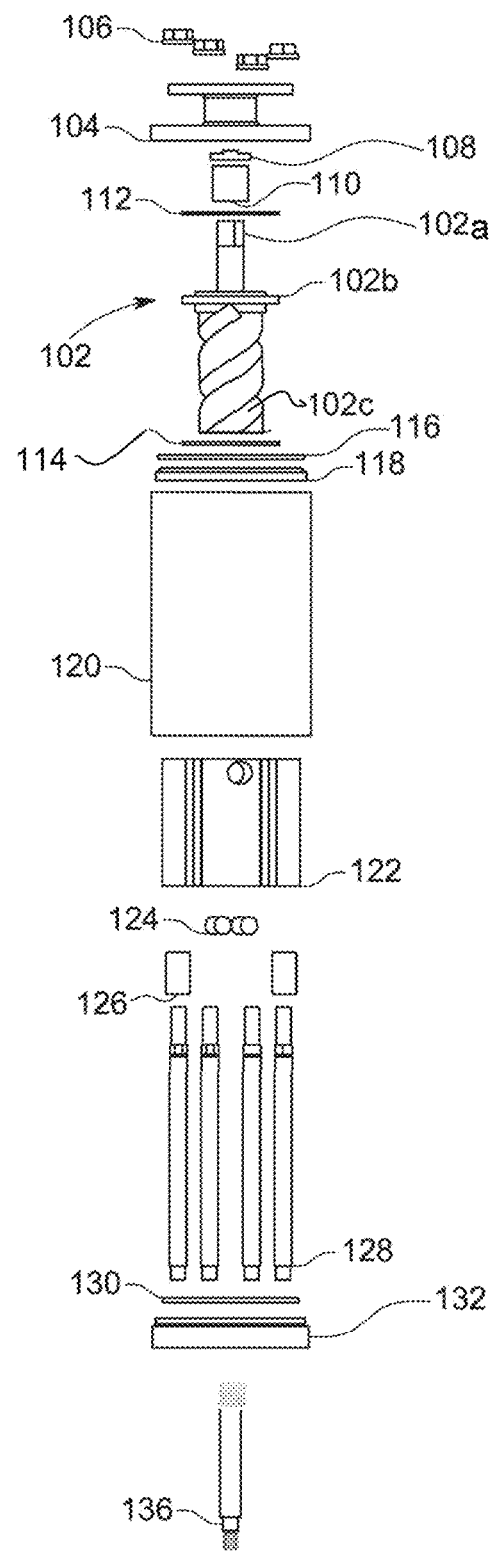
FIG. 2 is an "exploded" side view of the present invention disclosed in FIG. 1.

With further reference to FIGS. 1 and 2, the valve stem lifter assembly (100) generally comprises a rotary shaft (102), a flange adapter spool (104), a riser (122) and a base mounting plate (132).

The material used to form most component parts of the valve stem lifter assembly in the preferred embodiment is AISI 4140 steel, but another similar hardened metal or material that has high fatigue strength and abrasion and impact resistance could be substituted. All component parts can be manufactured using standard processes and standard equipment and tooling found in a typical state of the art machine shop, including a lathe and CNC mill.

With further reference to FIGS. 1 & 2, the rotary shaft (102) has a "squared" knob top end (102a), a transition flanged portion (102b), and an annular grooved shaft portion (102c). The knob end of the shaft (102a) is made in conformance with ISO-5211 or similar connection, and tapers to a rounded solid tubular portion that is milled to a diameter smaller than the transition flanged portion (102b). The knob end (102a) can be engaged to turn the shaft, which is slidably mounted coaxially through the hole with internal diameter in a flange adapter spool (104). A rod wiper (108) and sleeve (110) that have a diameter smaller than the inner diameter of the hole in the flange adapter spool (104), are slidably mounted coaxially before the knob end (102a) is inserted through the hole in the flange adapter spool (104). A bearing washer (112) is inserted between the sleeve (110) and the transition portion of the shaft (102b) to cushion when the flange spool adapter (104) is pressed together in final assembly against the top of the annular grooved shaft portion (102c) when the valve lifter is assembled.

Figure 3:
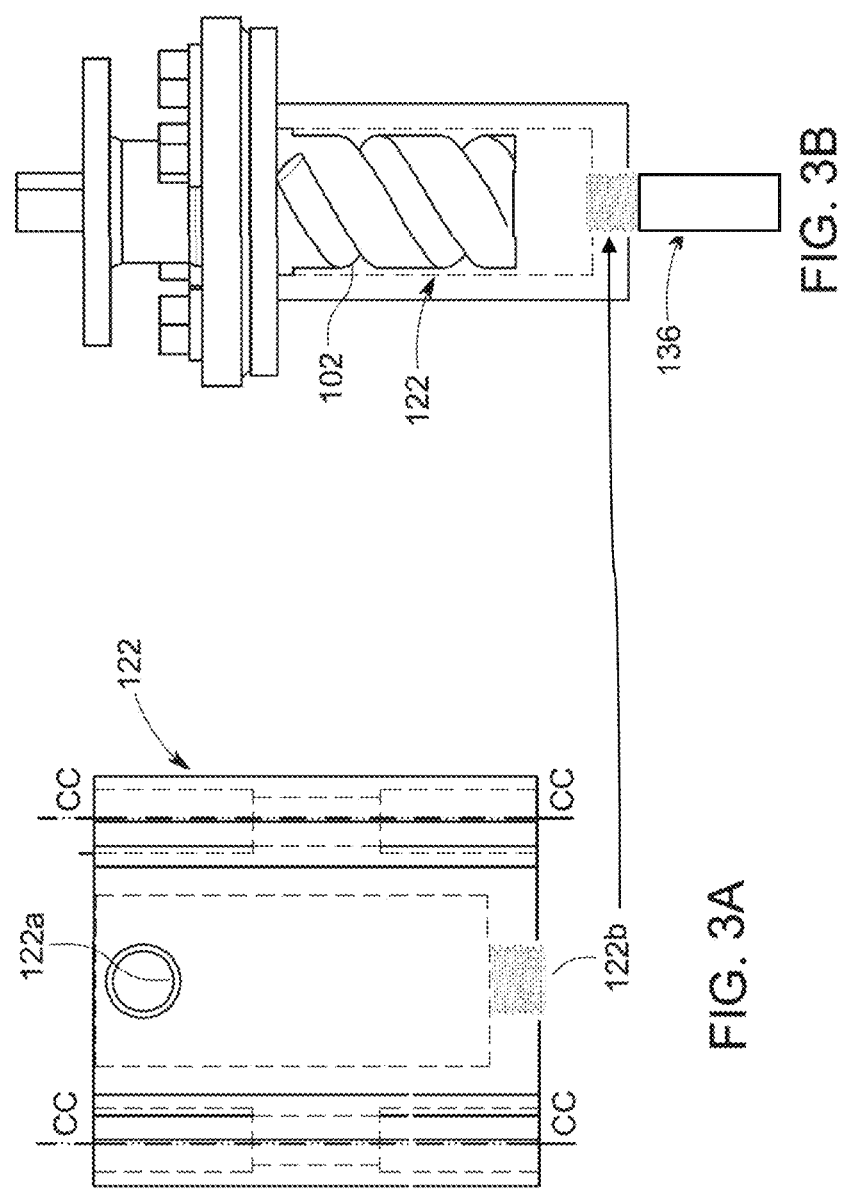
FIGS. 3A and 3B are side views of the present invention's riser and rotary shaft components, including some cross-sections.
Figure 4:
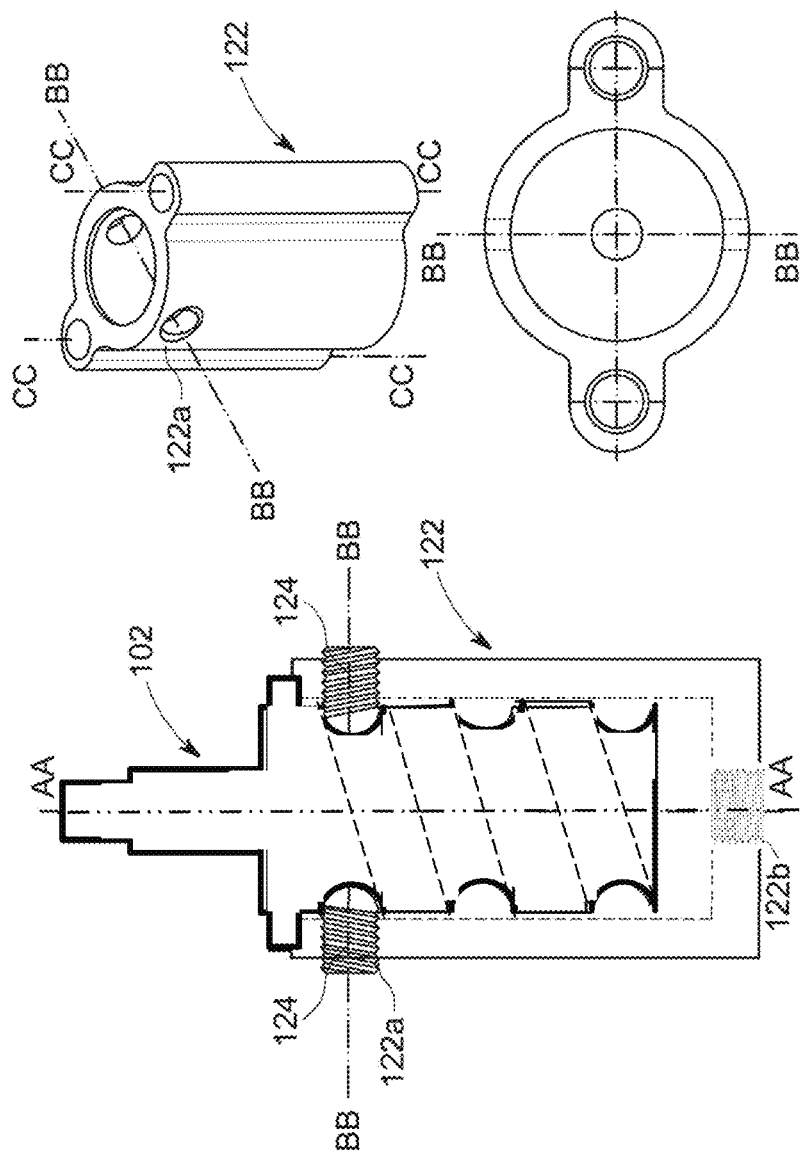
FIG. 4 presents a side, top and perspective view of the present invention's riser and rotary shaft components oriented in specific positions used for assembly.

With further reference to FIGS. 3 and 4, the annular grooved shaft (102c) has a helical annular groove formed around the shaft. The grooves on the annular grooved shaft portion (102c) can be milled using conventional processes by a lathe and conventional CNC mill process. The pitch of the groves on the preferred embodiment of the present invention is 4 inches with a 270-degree spin.

As illustrated in FIG. 2, a shaft load washer (114) is mounted below the bottom lip of the transition flanged portion of the rotary shaft (102b), and an O-ring (116) and bearing support flange (118) with inside diameters greater than the rotary shaft (102) are selectively pressed against flange adapter spool (104) when the valve lifter (100) is assembled.

Referring to FIGS. 1-4, the riser (122) comprises a main body with a tubular center passageway (along line AA), a threaded counterbored hole (122b) at its distal end for receiving a top external threaded portion of the pull shaft (136), and one or more hollow guide passageways (along lines CC) where the guide shaft rods (128) pass through the riser, which, along with the flange nuts (106), are used to secure and hold the lifter assembly components together and to prevent rotation of the riser. An O-ring (116) is mounted between the bottom of the flange adapter spool (104) and the top of the tubular main passageway of the riser (122). The tubular main passageway of the riser (122) has an internal diameter and is configured to accept the annular groove shaft portion of the rotary shaft (102c). The tubular center passageway further contains one or more radius set screw holes (122a) machined to accept radius set screws (124) that are used to rotatably connect the riser (122) to the grooves on the groove shaft portion of the rotary shaft (102c), as shown in FIG. 4 and described further below.

Assembly of the Valve Lifter

During assembly, with reference to FIGS. 2-4, the rotary shaft (102) is inserted and extended rotatably through the tubular center passageway of the riser (122), with a shaft load washer (114) mounted below the bottom lip of the transition flanged portion of the rotary shaft (102b) so that it fits between said bottom of the flanged portion (102b) and the top of the tubular center passageway of the riser (line AA).

A bearing washer (112) is inserted over the knob end of the shaft (102a) to rest on the top end of the transition flanged portion (102b). The sleeve (110) is inserted over the knob end of the shaft (102a) and a rod wiper (108) is fit above the sleeve on the knob end. Next the flange adapter spool with the O-ring (116) and bearing support flange (118) lined up on the bottom, is slipped over the tops of the guide rod shafts, and each of the said shafts is inserted through a respective hole (line CC) in the flange spool adapter (104).

Referring to FIG. 4, the two radius set screws (124) are screwed into the radius set screw threaded holes (122a) cut into the body of the riser (122) as is depicted along line BB (using a hexagonal shaped tool inserted into a hexagonal drive hole opening on the head of the screws (not shown)). The rotary shaft (102) is rotated along its axis shown by line AA, and aligned to the radius set screw holes (122a) to ensure the opposite sides of the grove on the rotary shaft (102) are aligned so that each radius set screw may be screwed and tightened to advance into the channel of the said grooves on the opposite sides of the shaft (180° apart) as is shown along line BB. Once this position is achieved, the screws are tightened and lockably engaged in place through locking adhesive (such as Solution 10, Medium Strength Thread Locker made by MRO Solutions, LLC) so that they will not back out without unscrewing. This ensures that the rotary shaft (102) will rotatably move in relation to being fixed to the riser (122) through the above-described placement of the radius set screws (124) in the rotary shaft's (102) groove channels.

In a preferred embodiment the radius set screws (124) are machined from black-oxide alloy steel, and include hexagonal drive hole. Exemplary sizes may be a ¾" length with 0.625" screw size and ⅝"-18 thread size with UNF threads.

In a preferred embodiment, during assembly, standard machine grease is injected into the riser and/or used to coat the shaft and grooves prior to the setting of the radius set screws (124) as above described.

The pull shaft (136) shown in FIG. 2 is rigidly connected to the bottom of the riser (122) along the axis depicted by line AA in FIG. 4. In a preferred embodiment, as shown in FIGS. 3A and 3B, an external threaded end of the pull shaft (136) is screwed into a threaded hole (122b) in the bottom of the riser (122).

Next, the guide shaft rods (128) with external threads formed around each end, are, respectively, screwed into threaded holes in the base mounting plate (132). An O-ring (130) is inserted on the top of the base mounting plate (132) and then the riser (122) is slipped over a selective portion of the guide rod shafts, and each of the said shafts is inserted through a respective hollow guide passageway of the riser (lines CC) in FIG. 3A, which are lined by guide shaft rod sleeves (126) as shown in FIG. 2, and so that said O-ring (130) is between the bottom of the riser (122) and the top of the base mounting plate (132).

Each of the flange nuts (106) shown in FIG. 2 are screwed on the ends of the guide rod shafts (128) extending through the top of the flange adapter spool (104) and tightened to ensure structural integrity of the valve lifter assembly (100). A dust cover pipe (120), which is tubular, may be placed over the riser and seated between the flange mounting spool (104) and base mounting plate (132) during installation. The dust cover pipe (120) may contain a lip or fasteners to allow proper seating.

Functioning of the Valve Stem Lifter

With further reference to FIG. 4, turning the knob end of the rotary shaft (102a) allows the rotary shaft (102) to move the riser (122) linearly up or down as the two radius set screws (124) travel along the spiral grooved pathway of the rotary shaft (102) in relation to the riser (122), and thereby the pull shaft (136), which is rigidly connected to the riser (122), correspondingly moves the same stroke length linearly as the riser (122). The knob end rotation may selectively extend or retract the pull shaft (136) distally from the assembled valve lifter body (100).

In one embodiment, rotational movement of the knob end of the rotary shaft (102a) may be accomplished through an electronic or hydraulic actuator controller (of the type well known in the industry) connected to the knob end (102a). Alternatively, the rotational movement may be achieved by manual turning of the knob end (102a).

Figure 5:
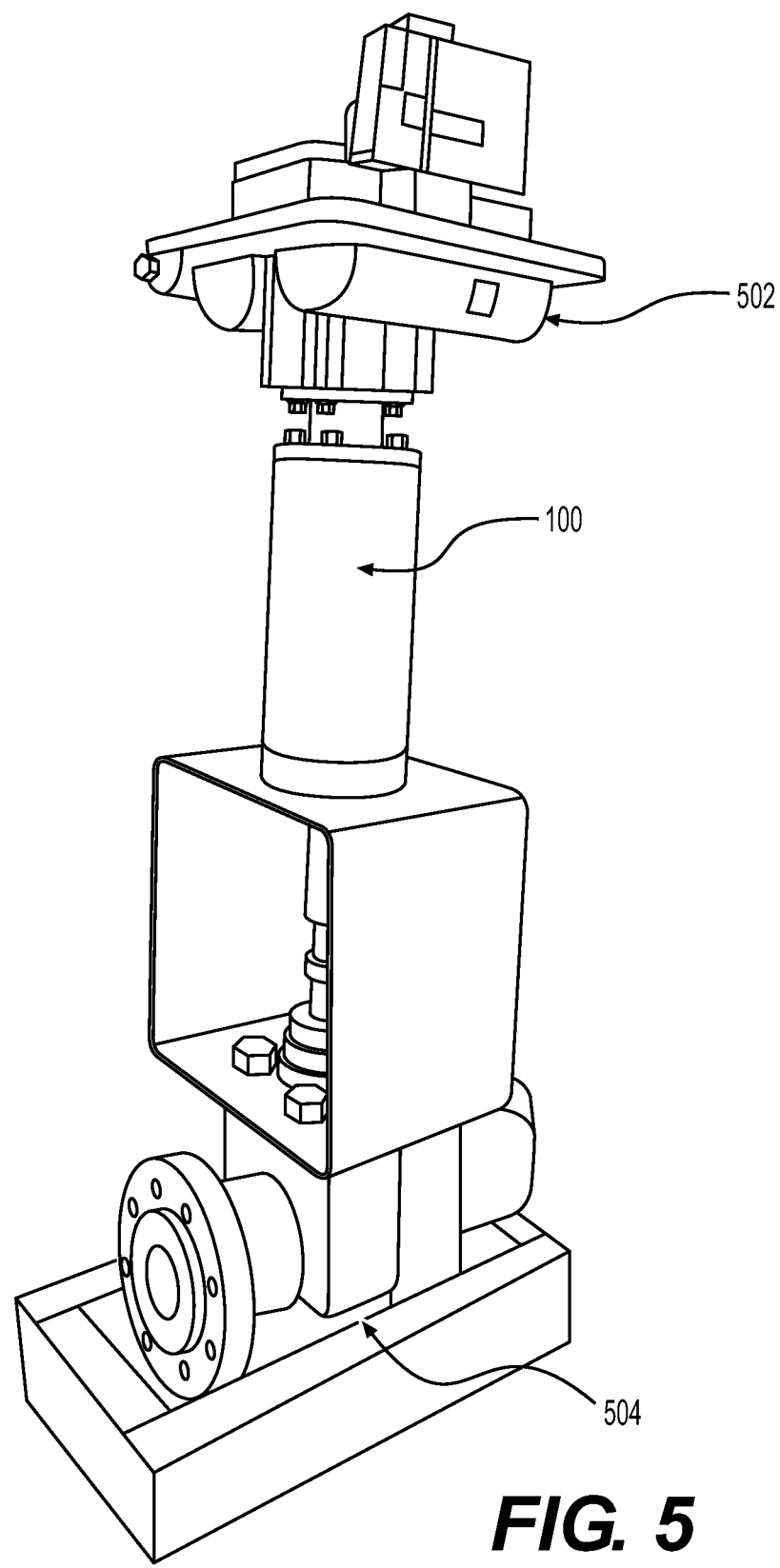
FIG. 5 illustrates a view of the present invention connected to a valve actuator and valve, as would be set up for testing purposes.

Referring generally to FIGS. 2 and 5, in accordance with the ultimate use of the described invention, a valve (504) is provided which comprises a main body that defines a valve chamber having an inlet and an outlet with a valve seat located there between. Positioned in the valve chamber is a valve element having an operating stem with a free end extending therefrom.

The pull shaft (136) may be connected to the valve seat's operating stem assembly to allow it to be used to open or close the valve as described herein. When the knob end of the rotary shaft (102a) is turned to extend the pull shaft (136) linearly away from the valve stem lifter (100), the pull shaft (136) pushes the valve's stem which presses a valve disk into the valve seat (not shown) to close the valve (504) and prevents a fluid from flowing through the valve. Conversely, when the knob end of the rotary shaft (102a) is turned clockwise, the pull shaft (136) pulls to retract the valve disk from the valve seat allowing a fluid to flow through the valve. The valve stem lifter (100) can also be used with an actuator (502) to throttle the valve seat between fully closed and open positions.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A valve stem lifter for opening and closing a valve, comprising:
a base frame comprising at least four guide rods attached thereto, wherein the guide rods are spaced equidistant from one another around the base frame;
a riser having a body slidably mounted to the guide rods, wherein the body comprises a plurality of slots, each lined with a sleeve, through which the guide rods pass, and the body further comprises two screws extending horizontally therethrough, the two screws positioned in a circumferentially spaced relationship substantially 180 degrees apart;
a pull rod rigidly connected to the riser and configured to engage a valve element on the valve;
a shaft rotatably connected to the riser by the two screws, wherein the shaft comprises a top end having a knob; and
an electronic actuator operatively connected to the knob at the top end of the shaft, wherein the electronic actuator is configured to rotate the shaft up to about 270 degrees and, upon rotation, the shaft is configured to provide axial movement to the riser and corresponding axial movement to the pull rod to open or close the valve.

2. The valve stem lifter of claim 1, wherein, upon rotation of the shaft, the pull rod is configured to move a stroke length of about three inches.

3. The valve stem lifter of claim 1, wherein the shaft comprises a helical groove configured for engagement with the two screws attached to the riser.

4. The valve stem lifter of claim 1, wherein the screws are made of alloy steel.

5. The valve stem lifter of claim 1, wherein the pull rod comprises an external threaded end configured to be screwed into a threaded hole in a bottom of the riser.

6. The valve stem lifter of claim 1, wherein the riser comprises a passageway having an internal diameter configured to accept the shaft therein.

7. The valve stem lifter of claim 6, wherein the passageway comprises two screw holes configured to accept each of the two screws.

8. A valve stem lifter for opening and closing a valve, comprising:

a base frame comprising at least four guide rods attached thereto, wherein the guide rods are spaced equidistant from one another around the base frame;

a riser having a body slidably mounted to the guide rods, wherein the body comprises a plurality of slots, each lined with a sleeve, through which the guide rods pass, and the body further comprises two screws fixedly secured thereto in a circumferentially spaced relationship substantially 180 degrees apart and the two screws extend horizontally through the body;

a pull rod rigidly connected to the riser and configured to engage a valve element on the valve;

a shaft comprising a helical groove and rotatably connected to the riser, wherein the two screws rotatably connect the riser to the helical groove and the helical groove has a 270-degree spin;

an electronic actuator operatively connected to a top end of the shaft, wherein the electronic actuator is configured to rotate the shaft up to about 270 degrees; and wherein, upon rotation of the shaft, the screws travel along the helical groove to provide axial movement to the riser and corresponding axial movement to the pull rod to open or close the valve element on the valve.

9. The valve stem lifter of claim 8, wherein the pull rod is configured to move a stroke length of about three inches.

10. The valve stem lifter of claim 8, wherein the top end of the shaft has a knob.

11. The valve stem lifter of claim 8, wherein the pull rod comprises an external threaded end configured to be screwed into a threaded hole in a bottom of the riser.

12. The valve stem lifter of claim 8, wherein the riser comprises a passageway having an internal diameter configured to accept the shaft therein.

13. A valve stem lifter for opening and closing a valve, comprising:

a base comprising at least four guide rods attached thereto, wherein the guide rods are spaced equidistant from one another around the base;

a riser having a body slidably mounted to the guide rods, wherein the body comprises a plurality of slots, each lined with a sleeve, through which the guide rods pass, and the body further comprises two screws fixedly secured thereto in a circumferentially spaced relationship substantially 180 degrees apart and the two screws extend horizontally through the body;

a pull rod connected to the riser and configured to engage a valve element on the valve;

a shaft comprising a helical groove and rotatably connected to the riser, wherein the two screws rotatably connect the riser to the helical groove; and an electronic actuator operatively connected to a top end of the shaft, wherein the electronic actuator is configured to rotate the shaft up to about 270 degrees in a clockwise direction or a counterclockwise direction;

wherein, upon rotation of the shaft in the clockwise direction, the screws travel along the helical groove to provide axial movement to the riser and corresponding axial movement to the pull rod to retract the valve element and open the valve, and wherein the pull rod is configured to move a stroke length of about three inches per full 270-degree rotation of the shaft.

14. The valve stem lifter of claim 13, wherein the screws are radius set screws.

15. The valve stem lifter of claim 14, wherein the riser comprises a passageway having an internal diameter configured to accept the shaft therein.

16. The valve stem lifter of claim 15, wherein the passageway comprises two radius set screw holes configured to accept each of the two radius set screws.

17. The valve stem lifter of claim 13, wherein the helical groove extends the length of the shaft.

18. The valve stem lifter of claim 13, wherein the pull rod comprises an external threaded end configured to be screwed into a threaded hole in a bottom of the riser.

* * * * *